2,927,939

STABILIZATION OF ALKYL NITRITES

Martin H. Yunker, Jr., Hatfield, Pa., and Takeru Higuchi, Madison, Wis., assignors to Wisconsin Alumni Research Foundation, Madison, Wis., a corporation of Wisconsin No Drawing. Application July 10, 1958
Serial No. 747,574

4 Claims. (Cl. 260—466)

The present invention relates to the stabilization of alkyl nitrites including nitrites having 1 to 16 carbon atoms in the alkyl chain. Deterioration of alkyl nitrites including isoamyl nitrite (Amyl Nitrite, U.S.P.) which is used to relax spasms in the arteries, to control convulsions, and for the relief of asthmatic paroxysm, as well as an adjuvant in the treatment of cyanide poisoning, has posed problems in the chemical and pharmaceutical industries. The problem is especially acute when the nitrite is stored for prolonged periods of time. Under such conditions, a considerable amount of gas is produced by degradation of the alkyl nitrite. When stored in ampules this may cause the ampules to explode spontaneously. Also, since ampules are used for administration of amyl nitrite by inhalation, they are ordinarily crushed between the fingers of the patient. If the ampule is under a large pressure due to degradation with gas formation, it may also explode with a loud noise during the breaking operation resulting in fright as well as possible injury. A case, for example, has been reported where a patient lost the sight of an eye from flying glass. Valeur, J., Repetoire Pharm., 29, 275 (1918). An additional important consequence of degradation is the monetary loss that occurs as a result of the disintegration of the ampules on standing.

The mechanisms involved in the breakdown of the alkyl nitrites are complex and are not completely understood. Hydrolysis in the presence of water along with oxygen and light have been suggested as playing a role in the overall degradation. Alkyl nitrites, however, protected from light and stored in the absence of water and oxygen are known to undergo degradation. The presence of a dehydrating agent such as calcium sulfate or magnesium sulfate has also been found to increase rather than decrease degradation of the alkyl nitrite. Temperature is also believed to be involved although it is known that degradation takes place at room temperatures as well as at the higher temperatures. The best evidence, based on our investigations, indicates that degradation is initiated by various factors or a combination of factors such as noted above and that the initial degradation products so formed, even in minute amounts, act as autocatalysts for the continued relatively rapid breakdown of the alkyl nitrite. In view of this it appeared that stabilization might be accomplished by use of a chemical which would destroy the auto-catalyst or prevent its formation.

As our investigations demonstrated that the presence of acidic substances such as trichloroacetic acid speeded up degradation and that some nitric acid was also formed on degradation, it was believed that strong bases such as triethylamine might provide a solution to the problem and stabilize the highly unstable alkyl nitrites such as amyl nitrite. This proved more than disappointing as relatively strong bases such as triethylamine not only failed to stabilize the alkyl nitrites but actually materially speeded up degradation with resulting increased gas formation. Para-nitromethylaniline was also tried as a stabilizer and while it did not materially speed up degradation as in the case of triethylamine, it proved of no use as degradation, as measured by gas formation, was slightly increased with this substituted amine.

With continued investigations we discovered that secondary aryl amines such as diphenylamine, pyridine and the like materially retarded or prevented degradation of alkyl nitrites when used at about 1–2 percent w./v. Why diphenylamine acts as a stabilizer and p-nitromethylaniline has just the opposite effect on alkyl nitrites in that it speeds up degradation is not known. The complexity of the overall degradation picture is also illustrated by the fact that N-alkyl nitro anilines such as p-nitromethylaniline are reported as superior to diphenylamine for stabilizing nitrocellulose. See Gallaghan et al. U.S. Patent 2,696,430. While secondary aryl amines such as diphenylamine and pyridine, like the solid inorganic alkaline materials discussed below, stabilize alkyl nitrites, e.g. alkyl nitrites containing 1 to 16 carbon atoms such as methyl, propyl, amyl, octyl, decyl, dodecyl and cetyl nitrites, the use of organic amines of this type in this field is sometimes considered objectionable as their use frequently produces color changes in the nitrite followed by the formation of precipitates.

In continued investigations we discovered that solid alkaline materials including salts and oxides of the alkali metals and alkaline earth metals proved to be the stabilizers of choice. In addition to being non-volatile, their use is not accompanied by color changes or by the formation of new precipitates. Illustrative examples include trisodium phosphate, sodium and potassium carbonates and magnesium oxide. For most purposes they are used in a range of about 0.5 to 2% (w./v.). Larger amounts can be employed but are usually avoided as amounts over about 2 percent do not produce any additional beneficial results. Of the solid alkaline materials the alkali metal carbonates and particularly potassium carbonate and the alkaline earth oxides and particularly magnesium oxide, used at about 1 to 2 percent (w./v.), proved to be the most effective and preferred. The following examples will serve to illustrate the invention.

Example I

Ampules containing about 2 percent (w./v.) of anhydrous potassium carbonate, based on the nitrite, were filled with isoamyl nitrite (Amyl Nitrite, U.S.P.) and sealed under vacuum. On standing at room temperature they proved to be stable and substantially free from gas formation.

Example II

Ampules containing about 2 percent (w./v.) of anhydrous magnesium oxide, based on the nitrite, were filled with isoamyl nitrite and sealed. On standing they proved to be stable and substantially free from degradation including gas formation.

Example III

This example is in accordance with Examples I or II, except that the solid inorganic acid absorbent is replaced by 1 to 2 percent (w./v.) of diphenylamine or pyridine. In place of the amyl nitrite, other nitrites containing 1 to 16 carbon atoms in the alkyl chain can also be stabilized in a like manner.

The degree of stabilization achieved by the present invention indicates that the shelf life of the nitrite esters can be readily prolonged as much as ten fold as compared to unstabilized commercial products. Although the degradation picture is not complete, the stabilizers of the present invention appear to act as "sinks" for the acidic auto-catalysts primarily responsible for alkyl nitrite degradation.

It is claimed:

1. The method of stabilizing alkyl nitrites having 1 to 16 carbon atoms in the alkyl chain which comprises maintaining the alkyl nitrite in contact with an alkaline material selected from the group consisting of alkali metal inorganic carbonate and phosphate salts and alkaline earth metal oxides and diphenylamine and pyridine.

2. An ampule of isoamyl nitrite containing about 1 to 2 percent weight per volume of potassium carbonate.

3. An ampule of isoamyl nitrite containing about 1 to 2 percent weight per volume of magnesium oxide.

4. An ampule of isoamyl nitrite containing about 1 to 2 percent weight per volume of an amine selected from the group consisting of diphenylamine and pyridine.

No references cited.